Figure 1:
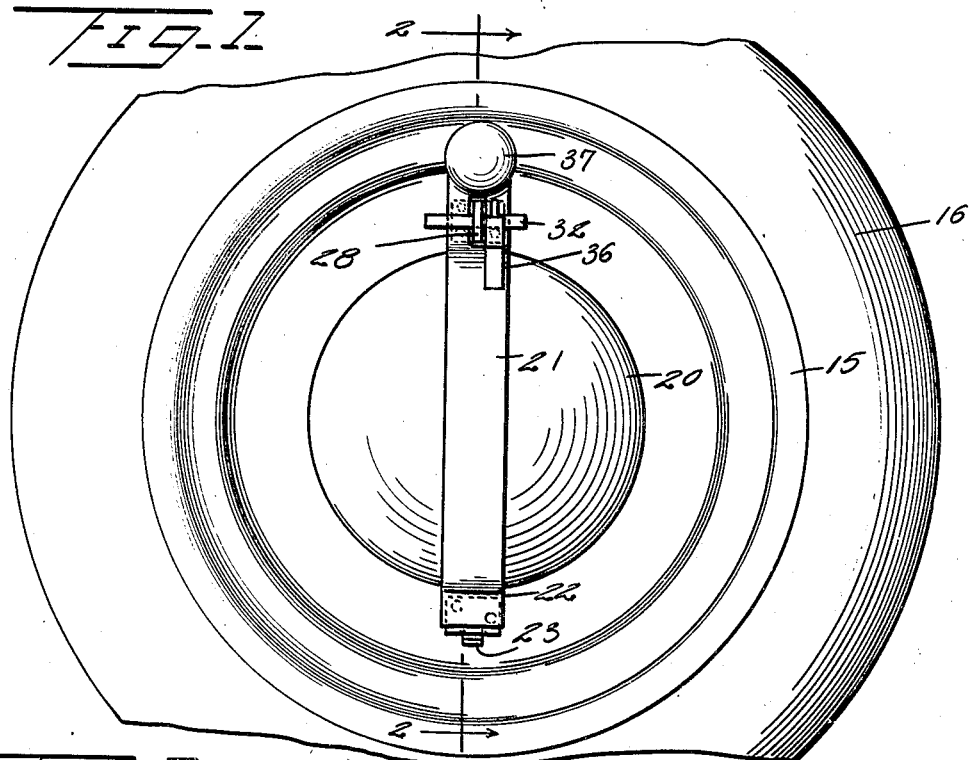

Sept. 29, 1942.  H. W. NORBERG  2,297,579
TIRE AND WHEEL LOCK
Filed April 22, 1942  2 Sheets-Sheet 1

Inventor
H. W. Norberg
By Kimmel & Crowell
Attorneys

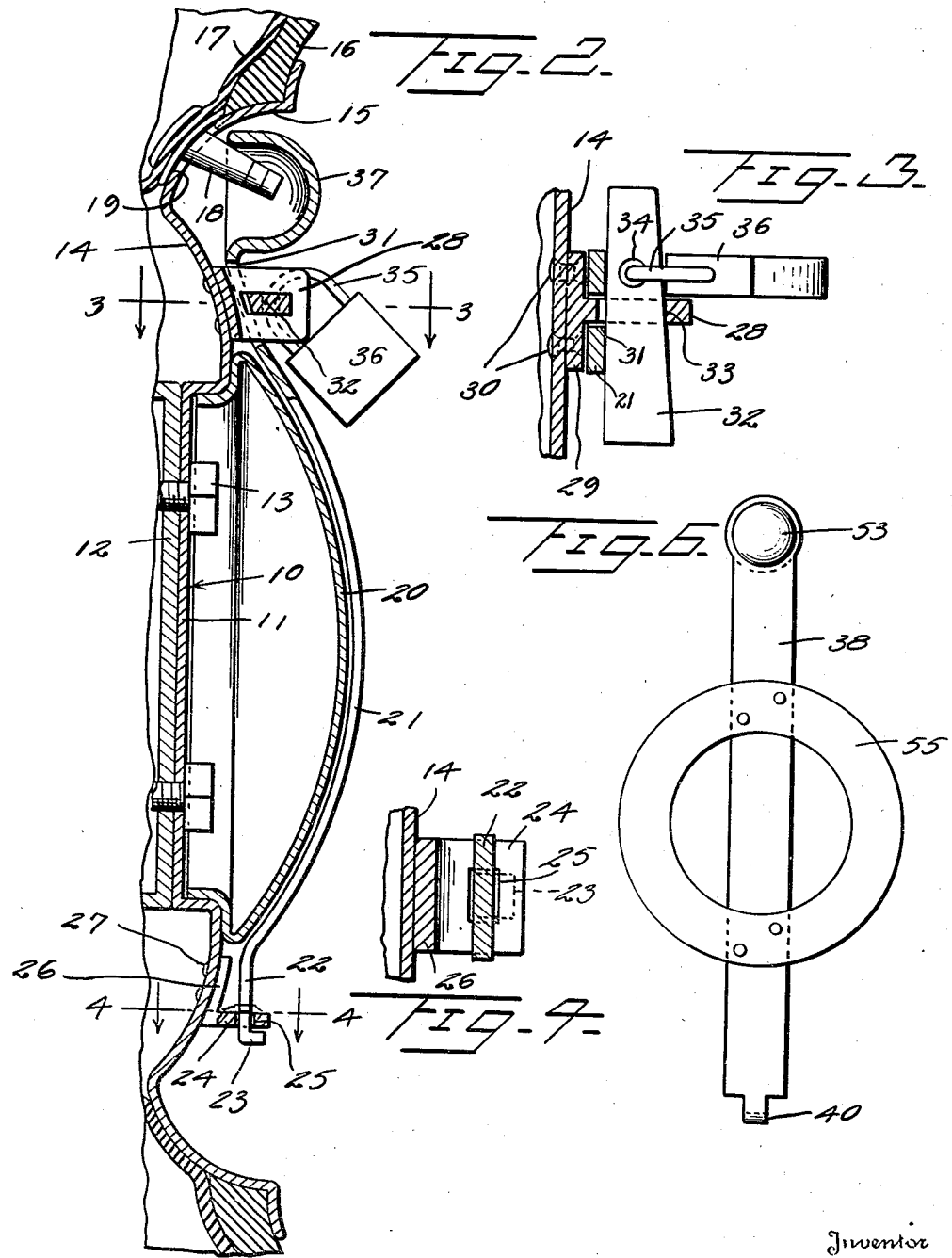

Patented Sept. 29, 1942

2,297,579

UNITED STATES PATENT OFFICE 2,297,579

TIRE AND WHEEL LOCK

Hugo W. Norberg, Flint, Mich.

Application April 22, 1942, Serial No. 440,064

6 Claims. (Cl. 70—259)

This invention relates to a combined tire and wheel lock.

An object of this invention is to provide a locking structure which will not only prevent theft of a wheel but also will prevent deflation and theft of a tire.

Another object of this invention is to provide a locking structure in the form of an elongated locking bar which is engageable over the hub cap so as to prevent removal of such cap and prevent access by an unauthorized person to the wheel securing bolts.

A further object of this invention is to provide a locking structure of this kind including a hub cap locking bar and a valve stem covering cap which is adapted to enclose the valve stem so as to thereby eliminate the possibility of an unauthorized person deflating a tire without removing a wheel.

A further object of this invention is to provide a locking structure which can also be used with trucks or vehicles which do not use hub caps so as to prevent unauthorized removal of both the wheel and the tire.

To the above objects and to others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

Figures 5, 7:
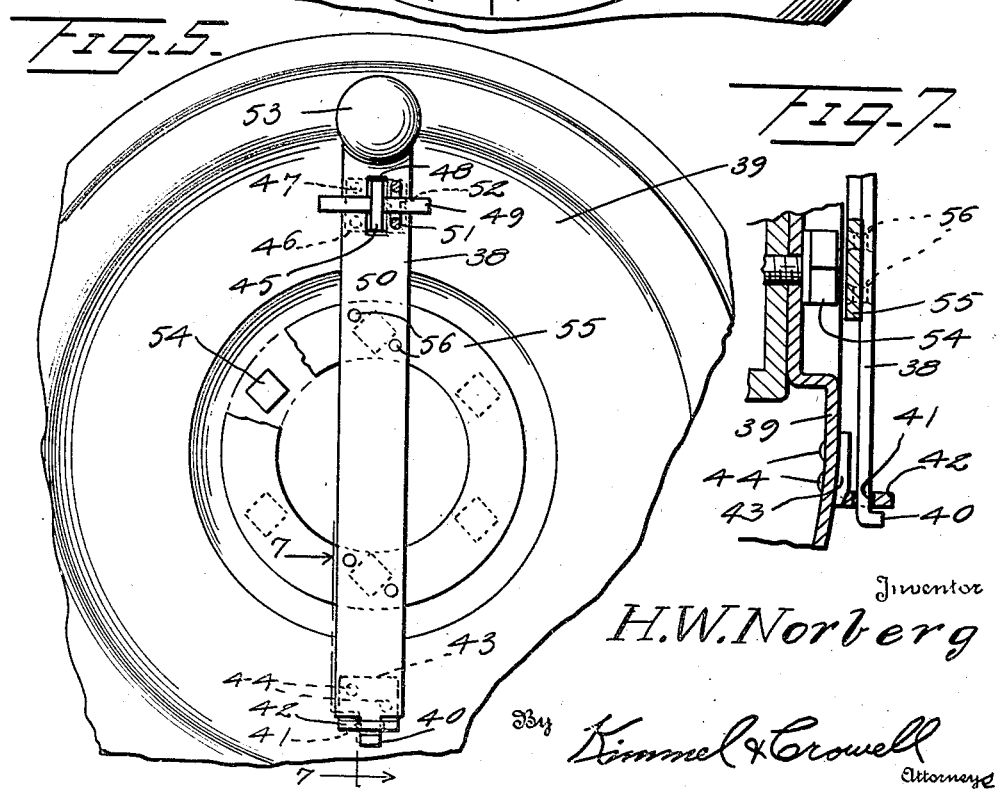

In the drawings:

Figure 1 is a detail side elevation partly broken away of a vehicle wheel having a locking structure for the wheel and tire mounted thereon, Figure 2 is a sectional view taken on the line 2—2 of Figure 1, Figure 3 is a sectional view taken on the line 3—3 of Figure 2, Figure 4 is a sectional view taken on the line 4—4 of Figure 2, Figure 5 is a fragmentary side elevation of a truck wheel having a modified form of wheel and locking structure mounted thereon, Figure 6 is a detail side elevation of the locking structure shown in Figure 5, and Figure 7 is a fragmentary sectional view taken on the line 7—7 of Figure 5.

Referring to the drawings, the numeral 10 designates generally a vehicle wheel of conventional construction which is formed out of metal and which includes a central recessed body part 11 which is adapted to be secured as by fastening bolts 13 to the brake drum 12 forming part of the vehicle structure.

The wheel 10 also includes an outer portion 14 which is bent inwardly as shown in Figure 2 and terminates in an outwardly bent rim portion 15. A tire or casing 16 is adapted to engage the rim portion 15 and is of the type known as a drop-center type within which an inner tube 17 provided with an outwardly projecting valve stem 18 is adapted to engage. The valve stem 18 projects through an opening 19 which is formed in the inner portion 15 of the rim. A cap 20 is adapted to be removably mounted on the wheel 10 so as to cover the bolts 13.

The structure hereinbefore described is conventional and is one illustration of a vehicle wheel with which the hereinafter described locking structure is adapted to be incorporated.

In order to provide a means whereby the cap 20 will be prevented from removal by an unauthorized person, I have provided an elongated longitudinally bent flat locking bar 21 which is adapted to engage over the outer side of the cap 20. The bar 21 at one end thereof is provided with a straight portion 22, and an L-shaped holding lock 23 extends from the end of the straight portion 22. The lock 23 constitutes a locking bolt and is extended through an outwardly extending keeper 24 which is formed with an opening 25 through which the locking lug or bolt 23 is adapted to extend. The keeper 24 is formed with an integral base plate 25 which is of a configuration conforming to the configuration of the inwardly bent wheel portion 14 and is secured to the inwardly bent wheel portion 14 by fastening members 27 or the like.

A second keeper 28 is disposed diametrically opposite the keeper 24 and is formed with a base plate 29 secured by fastening members 30 to the inwardly bent wheel portion 14. The bar 21 is provided with an elongated opening 31 within which the keeper 28 is adapted to engage and in order to hold the bar 21 against vibration with respect to the keeper 28, a wedge member 32 is inserted through an opening 33 which is provided in the keeper 28. The wedge member 32 is adapted to press against the outer side of the bar 21 so as to press this bar 21 against the base 29. The wedge 32 is formed with an opening 34 through which the locking bolt 35 of a conventional lock 36 is adapted to engage so as to thereby hold the wedge 32 against unauthorized removal.

The bar 21 at the end thereof adjacent the opening 31 is formed with a cap or inwardly opening housing 37 which is adapted to encompass the valve stem 18. When the bar 21 is in applied or locking position, the cap 37 will encompass the valve stem 18 so that the inner tube 17 of the tire cannot be deflated by an unauthorized person and thereby removed with the casing 16 from the wheel 10.

In Figures 5 to 7, inclusive, there is disclosed a slight modification of this locking structure which is adapted to be mounted on a truck wheel which usually is not provided with a hub cap enclosing the wheel bolts. An elongated bar 38 which is of a configuration to conform to the configuration of the truck wheel 39 is adapted to be extended diametrically of the wheel 39 and is formed at one end with an L-shaped locking bolt 40. The bolt 40 engages through an opening 41 formed in a keeper 42 similar to the keeper 24. The keeper 42 is provided with a base plate 43 secured by fastening members 44 to the outer side of the wheel 39. A second keeper 45 which is provided with a base plate 46 is secured by fastening devices 47 to the wheel 39 diametrically opposite the keeper 42. The bar 39 is formed with an opening 48 through which the keeper 49 is adapted to project and a wedge member 49 similar to the wedge 32 is extended through an opening 50 which is formed in the keeper 45 outwardly of the bar 38.

A lock member 51 is adapted to engage through an opening 52 which is formed in the wedge 49 on the small side thereof so that the wedge 49 cannot be removed by an unauthorized person. The bar 38 is also formed with an inwardly opening valve stem enclosing housing 53 similar to the housing 37 so that the tire mounted on the wheel 39 cannot be deflated and removed without first removing the locking bar 38.

In order to provide a means whereby the wheel securing bolts 54 cannot be loosened in order to remove the wheel 39 by an unauthorized person, the bar 38 is provided with a ring-shaped bolt covering member 55. The ring-shaped bolt covering member 55 is secured to the inner side of the locking bar 38 by fastening devices 56. In applied position the annular or ring-shaped bolt covering member 55 will be in the position shown in Figure 5.

In the use of this locking structure, the locking bar 21 is initially engaged at one end with the keeper 24, the L-shaped locking bolt 23 being extended through the opening 25. The bar 21 overlies and extends diametrically across the cap 20 and is then inserted over the keeper 28. The wedge 32 is then driven through the opening 23 and the lock member 36 has the locking bolts 35 thereof extended through the opening or keeper 34 formed in the wedge 32. In applied position the inwardly opening or facing housing 37 encompasses the valve stem 18 as shown in Figure 2 so that the housing 37 will prevent an unauthorized person from gaining access to the valve stem 18 in order to deflate and subsequently remove the tire.

What I claim is:

1. A combined tire and wheel lock for mounting on a vehicle wheel having a hub cap comprising an elongated bar for positioning across the outer side of the cap, an L-shaped bolt carried by one end of said bar, a keeper for said bolt, means securing said keeper to said wheel, a second keeper, means securing said second keeper diametrically opposite said first keeper, said bar having an opening through which said second keeper is adapted to project, said second keeper having an opening therethrough, a wedge member engageable through said keeper opening, and means for locking said wedge member against endwise movement.

2. A combined tire and wheel lock for mounting on a vehicle wheel having a hub cap comprising an elongated bar for positioning across the outer side of the cap, an L-shaped bolt carried by one end of said bar, a keeper for said bolt, means securing said keeper to said wheel, a second keeper, means securing said second keeper diametrically opposite said first keeper, said bar having an opening through which said second keeper is adapted to project, said second keeper having an opening therethrough, a wedge member engageable through said keeper opening, means for locking said wedge member against endwise movement, and a valve stem enclosing housing carried by the opposite end of said bar.

3. A wheel lock comprising a pair of keepers, means mounting said keepers on a wheel, an elongated locking bar, a bolt carried by one end of said bar engageable with one of said keepers, said bar having an opening adjacent the opposite end thereof through which the other keeper engages, said other keeper having an opening therethrough, a wedge engageable in said latter opening and bearing aainst the outer side of said bar, and means locking said wedge against endwise movement in one direction.

4. A wheel and tire lock comprising a pair of keepers, means mounting said keepers on a wheel, an elongated locking bar, an L-shaped bolt carried by one end of said bar and engageable with one of said keepers, said bar having an opening adjacent the opposite end thereof through which the other keeper engages, said other keeper having an opening therethrough, a wedge engageable in said latter opening and bearing against the outer side of said bar, means locking said wedge against endwise movement in one direction, and a valve stem encompassing housing fixed to the opposite end of said bar.

5. A wheel and tire lock comprising a pair of keepers, means mounting said keepers on a wheel, an elongated locking bar, an L-shaped bolt carried by one end of said bar and engageable with one of said keepers, said bar having an opening adjacent the opposite end thereof through which the other keeper engages, said other keeper having an opening therethrough, a wedge engageable in said latter opening and bearing against the outer side of said bar, means locking said wedge against endwise movement in one direction, a valve stem encompassing housing fixed to the opposite end of said bar, and an annular bolt covering member carried by said bar intermediate the ends thereof.

6. In combination, a vehicle wheel provided with a removable hub cap, and a tire including an inner tube stem projecting laterally through said wheel, an elongated lock bar disposed diametrically of the outer side of said cap, a keeper fixed to said wheel, an L-shaped locking bolt carried by one end of said bar and engageable with said keeper, a second keeper formed with an opening and disposed diametrically opposite said first keeper, said bar having an opening through which said second keeper is adapted to project, a wedge member engageable through said keeper opening and bearing against the outer side of said bar, locking means for holding said wedge member against endwise movement in one direction, and an inwardly facing housing carried by the opposite end of said bar engageable about said valve stem to thereby protect said tire against unauthorized deflation.

HUGO W. NORBERG.